United States Patent [19]
Liu

[11] Patent Number: 6,077,164
[45] Date of Patent: Jun. 20, 2000

[54] METHOD OF USING SPEECH TO CONTROL A GAME PROGRAM, AND GAME MACHINE CONTROLLER THEREFOR

[76] Inventor: Da-Ming Liu, 5F, No. 13, Pao Kao Rd., Hsin Tien, Taipei Hsien, Taiwan

[21] Appl. No.: 08/912,640

[22] Filed: Aug. 18, 1997

[51] Int. Cl.[7] .................................................. A63B 15/00
[52] U.S. Cl. ............................................................ 463/36
[58] Field of Search .................................. 463/36, 37, 38, 463/39; 434/185; 3/307 A, 307 R; 704/200, 231, 246

[56] References Cited

U.S. PATENT DOCUMENTS 5,553,864  9/1996  Sitrick ....................................... 463/31
5,829,755  11/1998  Chen ........................................ 273/408

*Primary Examiner*—Valencia Martin-Wallace
*Assistant Examiner*—Sheila Clayton
*Attorney, Agent, or Firm*—Bacon & Thomas, PLLC

[57] ABSTRACT

The invention provides a method of using speech to control a game program of a game machine and a game machine controller for the application of the method, through the method and the game machine controller, the operator can control special function keys of the game program (for example, special actions or the so-called knack of different roles in the game program) by speech or control keys as desired.

17 Claims, 5 Drawing Sheets

| 1 | INNER STRENGTH |
|---|---|
| 2 | ROTARY KICK |
| 3 | DRAGON-RISE BLOW |
| . | . |
| . | . |

FIG.5

| 1 | ↓ ↘ → Y |
|---|---|
| 2 | ↓ ↙ ← A |
| 3 | → ↓ A |
| . | . |
| . | . |

FIG.6

| INNER STRENGTH | ↓ ↘ → Y |
|---|---|
| ROTARY KICK | ↓ ↙ ← A |
| DRAGON-RISE BLOW | → ↓ A |
| . | . |
| . | . |

FIG.7

METHOD OF USING SPEECH TO CONTROL A GAME PROGRAM, AND GAME MACHINE CONTROLLER THEREFOR

BACKGROUND OF THE INVENTION

The present invention relates to a game machine controller adapted for controlling the actions of characters roles in a game program of a game machine by speech or control keys. The invention relates also to the method of using speech signal to control the actions of characters in the game program of the game machine through the game machine controller.

In a regular fighting game program, there are various fighters having special action or moves (skill in fighting). FIG. 4 shows the arrangement of a game machine (computer game machine) controller. The game machine controller is comprised of a CPU (central processing unit) 9 connected to the game machine 92, and a keyboard or joystick 91 connected to the CPU 9 for control signal input. Through the keyboard or joystick 91, control signals are inputted into the CPU 9 and then sent by the CPU 9 to the game machine 92 to control the actions of the characters in the game program played in the game machine 92. If the operator is not skilled in controlling the keyboard or joystick, he (she) cannot efficiently control the actions of the characters in the game program as desired. In order to skillfully control the actions of the characters in the game program, one shall have to practice for skill.

SUMMARY OF THE INVENTION

The present invention has been accomplished under the circumstances in view. It is the main object of the present invention to provide a method of controlling the actions of roles in a game program by speech so that any beginner can skillfully control the actions of the roles. It is another object of the present invention to provide a game machine controller for controlling special function keys of a game program by speech which allows the user to alternate the control between speech signals and the actions (or capabilites) of the characters in the game program.

BRIEF DESCRIPTION OF THE DRAWINGS

FIG. 5 shows a serial number-speech signal conversion table of an electrically erasable programmable read only memory according to the present invention;

FIG. 6 shows a serial number-action control signal conversion table of an electrically erasable programmable read only memory according to the present invention;

FIG. 7 shows a speech signal-action control signal conversion table of an electrically erasable programmable read only memory according to the present invention.

DETAILED DESCRIPTION OF THE PREFERRED EMBODIMENT

Figure 1:
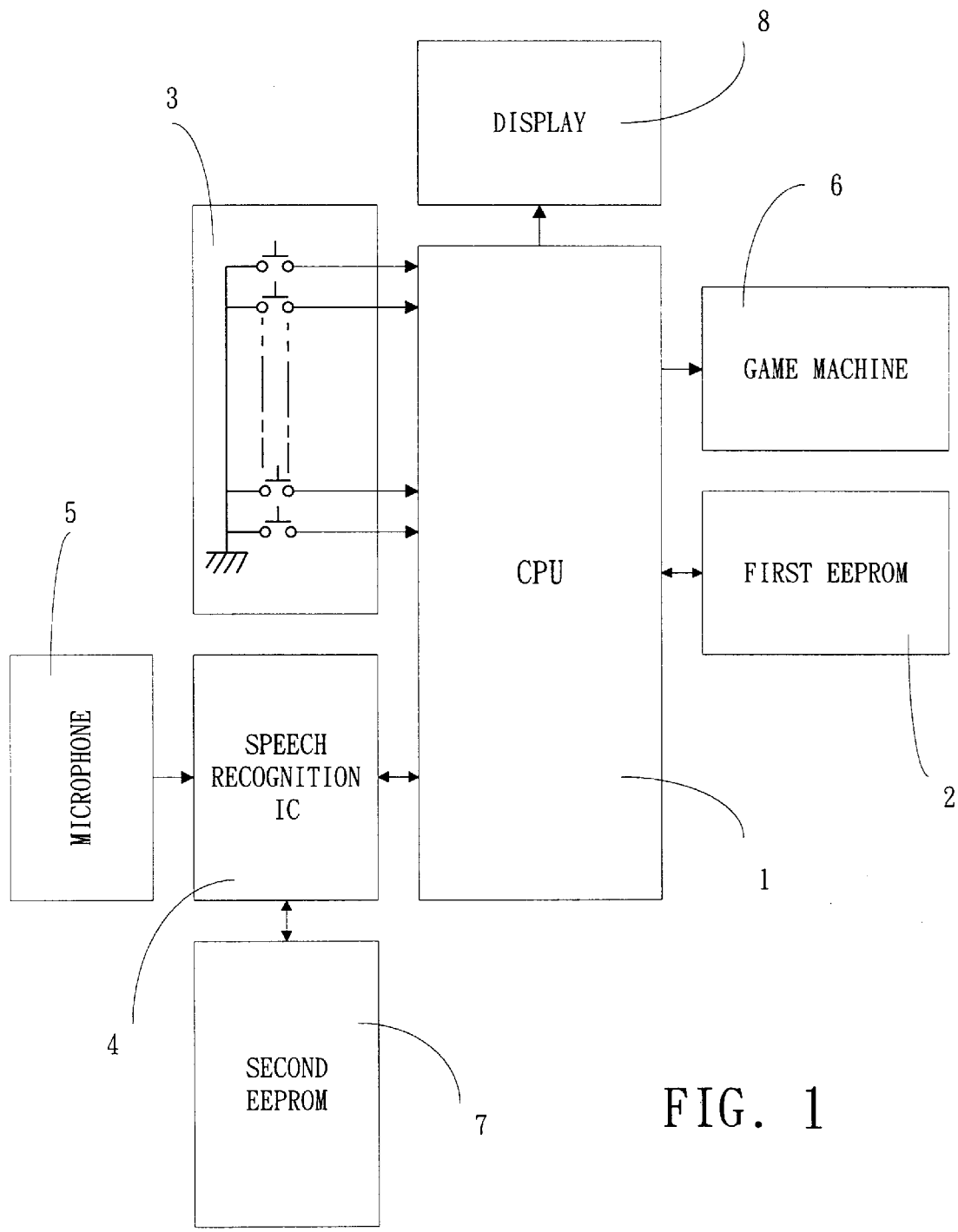
FIG. 1 is a block diagram of a game machine controller according to the present invention.

Referring to FIG. 1, a game machine controller in accordance with the present invention is adapted for controlling the operation of a game machine 6, comprised of a CPU (central processing unit) 1, a first EEPROM (electrically erasable programmable read only memory) 2, a non-speech type input device (a keyboard or joystick) 3, a speech recognition IC (integrated circuit) 4, a microphone 5, and a second EEPROM 7. The CPU 1 is respectively connected to the first EEPROM 2, the non-speech type input device 3, a speech recognition IC 4 and the game machine 6. The speed recognition IC 4 is connected to the second EEPROM 7 and the microphone 5. The CPU 1 and some of the parts connected thereto can be mounted on a circuit board.

Figure 2:
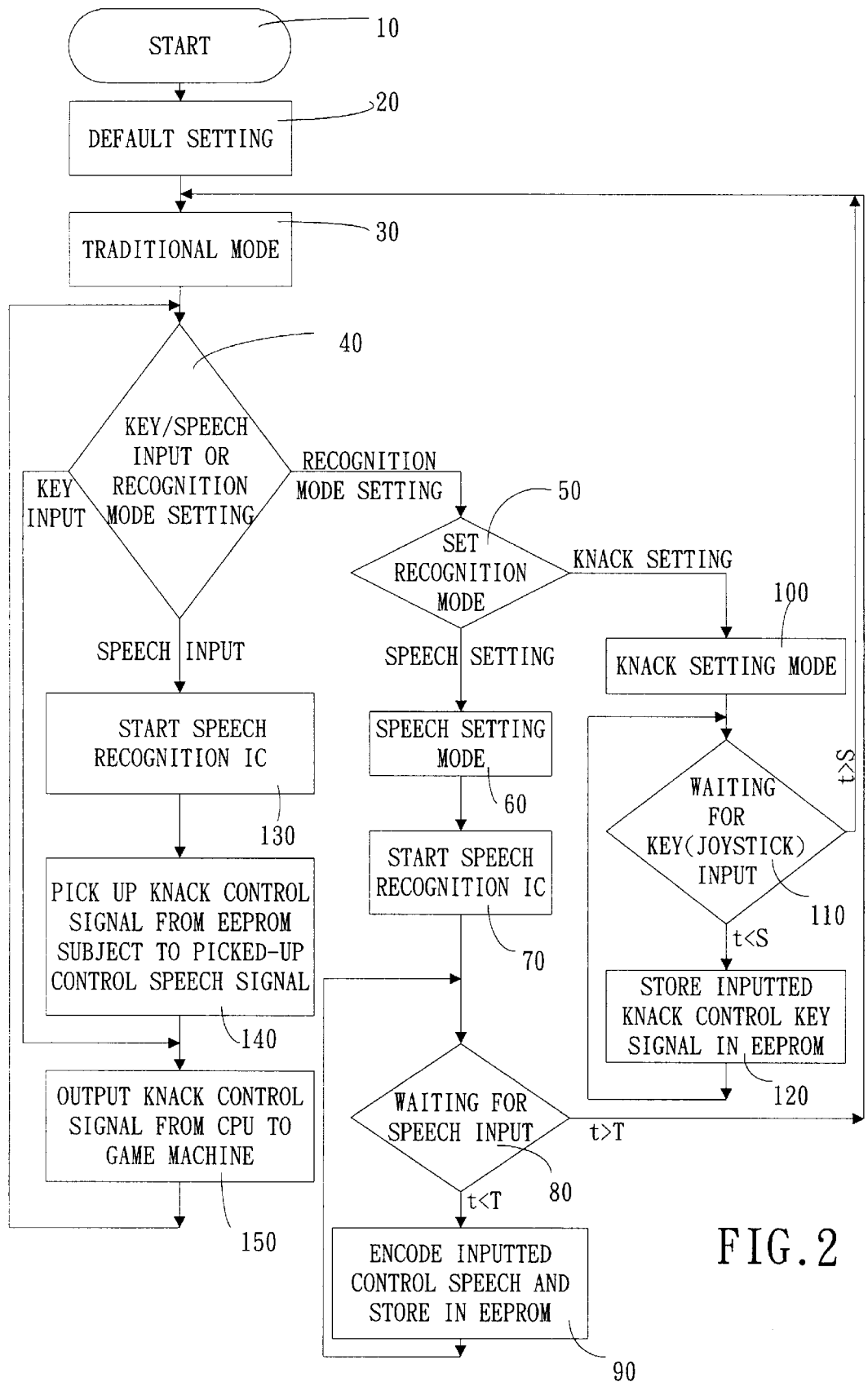
FIG. 2 is an operation flow chart of the present invention.
Figure 3:
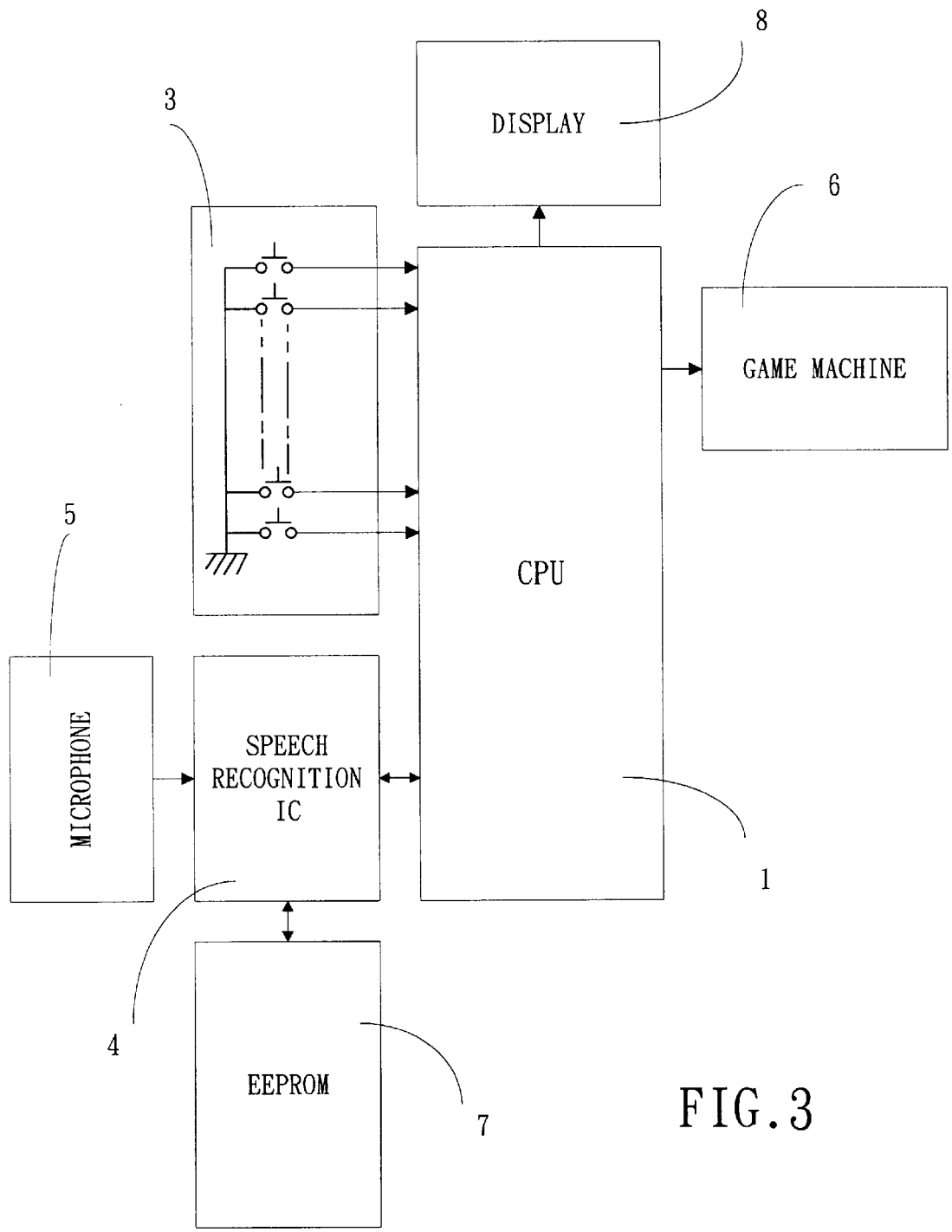
FIG. 3 is a block diagram of an alternate form of the game machine controller according to the present invention.
Figure 4:
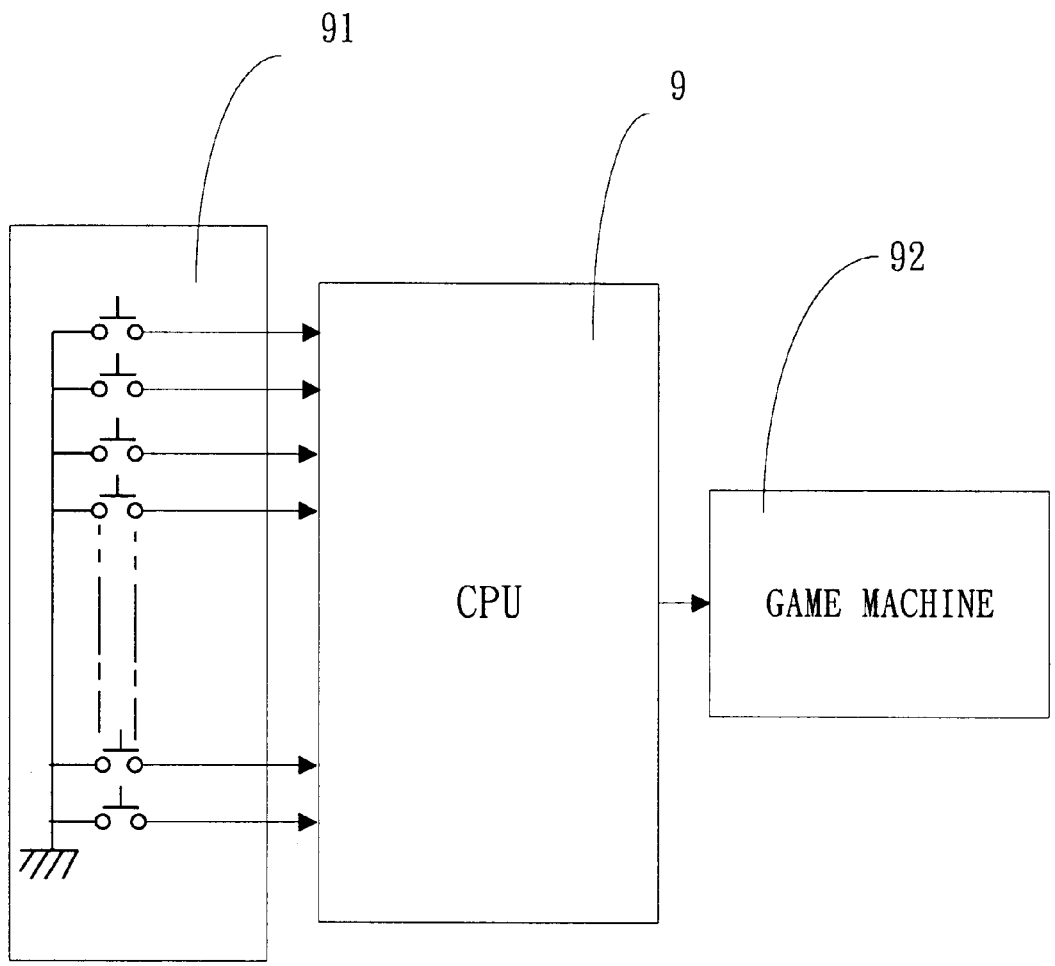
FIG. 4 is a block diagram of a game machine controller according to the prior art.

Referring to FIG. 2, the operation of the aforesaid game machine controller is outlined hereinafter. When the system is at the start status (10), the CPU 1 tests all parts of the controller system and then enters the default setting status (20) if the test result is normal. When at the default setting status (20), the CPU 1 sets the initial values of all parts of the controller, and then the system enters the tradition mode (30). If the operator does not make any setting when at the tradition mode (30), the system operates subject to its default value. Under the tradition mode (30), the CPU 1 makes judgment subject to inputted control signal and determines whether to enter the keyboard (joystick) input, speech input or mode setting input status (40), and the system proceeds to the following control flow subject to the selected input mode:

1. Keyboard (joystick) input: the operator uses the non-speech type input device 3 to input control signals, for example, in a regular game program for controlling the actions of a character, such actions or moves might include a) inner strength, b) rotary kick, c) dragon-rise blow, etc., and the input methods of the corresponding action are as follows:

| Item | Input method |
| --- | --- |
| a) inner strength | joystick downwards, rightwards and Y key |
| b) rotary kick | joystick downwards, leftwards and Y key |
| c) dragon-rise blow | joystick leftwards, downwards and A key |
| . | . |
| . | . |
| . | . |

After input by keyboard or joystick, the CPU 1 directly transmits control signals to the control chip (not shown) of the game machine 6, enabling the control chip to control the actions or moves.

2. Speech input: The operator uses the microphone 5 to send control speech to the speech recognition IC 4, and the speech recognition IC 4 converts inputted speech into a corresponding speech signal and compares the speech signal with speech control signals of a data conversion table stored in the second EEPROM 7 (the second EEPROM 7 is programmed with a data conversion table containing pre-set speech control signals that correspond to action control key signals or different serial numbers; if the data conversion table of the second EEPROM 7 contains speech control signals corresponding to different serial numbers, the data conversion table programmed in the first EEPROM 2 contains action control key signals corresponding to different serial numbers, so that speech control signals can be indirectly corresponded to action control key signals). If the conversion table of the second EEPROM 7 contains speech control signals corresponding to different serial numbers, an inputted speech from the operator will be recognized corresponding to a particular serial number by the speech recognition IC 4, and the recognized serial number will be sent to the CPU 1 for processing. Upon receipt of a particular serial number from the speech recognition IC 4, the CPU 1 immediately picks up the corresponding action control key signal from the data conversion table of the first EEPROM 7, and then sends the picked-up action control key signal to the control chip of the game machine 6 for commanding the character of the game program to make the corresponding action.

3. Mode setting input: This input method includes a speech setting mode and an action setting mode. The setting method of the action setting mode is done by keyboard or joystick. The setting method of the speech setting mode is done by storing the operator's speech control signal in the data conversion table of the second EEPROM 7, and the speech control signal can be changed subject to the operator's requirement. When the mode setting key is switched to the mode setting status, the system judges the setting mode (50). If the speech setting mode is selected (60), the system immediately starts the speech recognition IC 4 (70) and enters the status of speech setting serial number (80).

In order to let the operator know the correctness of one's input and the processing status of the CPU 1, a display 8 is provided and connected to the CPU 1. The display 8 can be a liquid-crystal display or a set of light emitting diodes. Through the display 8, the serial number to be processed is shown. When the operator's control speech is inputted into the controller through the microphone 5, the speech recognition IC 4 writes the speech control signal into the corresponding memory address which corresponds to a particular serial number of the data conversion table of the second EEPROM 7. After setting, please refer to FIG. 5, the system returns to stand-by status (80) awaiting for a next speech input. At the stand-by status (80), the operator can then input another control speech into the speech recognition IC 4 through the microphone 5 for encoding, permitting the encoded signal to be written into the corresponding memory address which corresponds to another particular serial number of the data conversion table of the second EEPROM 7 (90). By repeating the setting, the control speeches to be used by the operator are set one after another subject to the order of the serial numbers of the data conversion table of the second EEPROM 7. Further, when the speech recognition IC 4 is at the stand-by status, the length of waiting time T can be set as desired. If the operator does not input any control speech within the set waiting time T, the system immediately returns to the traditional mode (30).

When the operator selects action setting mode (100), the system shows the serial number of the action setting mode through the display 8, and waits for key (joystick) input (110). Please refer to FIG. 6, when the operator finishes an action control key input, the CPU 1 immediately writes the action control key into the first EEPROM 2 (120). For example, when under the input status of serial number 1, i.e., the joystick downwards, rightwards and Y key, the CPU 1 immediately writes this control signal into the first EEPROM 2 at the column corresponding to the serial number 1, and then the system enters the stand-by mode waiting for key (joystick) input (110). If there is no key (or joystick) signal input within the set time S, the CPU 1 immediately writes the inputted action control keys into the first EEPROM 2. After setting, the system immediately returns to the stand-by mode (110).

When in use, power is turned on, causing the system to enter the start mode 10, then the system proceeds to the default setting mode (20). When the default setting is done, the system immediately proceeds to the tradition mode (30), enabling the operator to select the function of the controller from action key (keyboard or joystick) input, speech input or mode setting input status (40). If the operator directly controls the keys of the controller or the joystick for action control, the action control signal is directly transmitted to the game machine 6 (150) for controlling the action of the role in the game program. If the operation selects the speech input mode, the operator's speech is inputted into the speech recognition IC 4 through the microphone 5, and then compared by the speech recognition IC 4 with the control speech signals stored in the second EEPROM 7. When matched, the speech recognition IC 4 immediately picks up the corresponding serial number (140) and sends it to the CPU 1, enabling the CPU 1 to obtain the corresponding action control key signal from the first EEPROM 2 and then to send the obtained action control key signal to the game machine 6 for controlling the action of the role in the game program.

Further, as an alternate form of the present invention, the controller can have only one EEPROM, namely, the first EEPROM 2. Under this configuration, the operation flow of the system is as follows: The speech recognition IC 4 converts inputted speech into a corresponding speech control signal, then compares the speech control signal with the speech control signal stored in the EEPROM 2, and then picks up the corresponding action control signal, as shown in FIG. 7, permitting the picked up action control signal to be transmitted to the game machine 6.

While only one embodiment of the present invention has been shown and described, it will be understood that various modifications and changes could be made thereunto without departing from the spirit and scope of the invention disclosed.

What is claimed is:

1. A method of using speech to control a game program, comprising the steps of:

(i) starting a speech recognition integrated circuit of a game machine controller to store inputted speech signal in one memory address of data conversion table of an electrically erasable progammable read only memory unit of the game machine controller when setting an operation status;

(ii) storing an action control signal in another memory address of the data conversion table of said electrically erasable programmable read only memory unit, said action control signal controlling an action of a character in the game program, and permitting the stored action control signal to be associated with the speech control signal; and (iii) letting said speech recognition integrated circuit compare the received speech input signal with the speech control signal stored in said electrically erasable programmable read only memory unit when the speech recognition integrated circuit receives a speech input signal from the operator, and enabling said speech recognition integrated circuit to pick up the corresponding action control signal from said electrically erasable programmable read only memory unit when matched, and then to send the picked up action control signal to a central processing unit of the game machine controller, for permitting it to be sent by said central processing unit to a game machine for running a game program.

2. The method of claim 1, wherein said electrically erasable programmable read only memory unit comprises a first electrically erasable programmable read only memory for storing speech signals corresponding to pre-set serial numbers and a second electrically erasable programmable read only memory for storing action control signals corresponding to the serial numbers stored in said first electrically erasable programmable read only memory, so that when said speech recognition integrated circuit receives a speech signal from the operator, it compares the received speech signal with the speech signals stored in the data conversion table of said first electrically erasable programmable read only memory, then picks up the corresponding action control signal from said second electrically erasable programmable read only memory, permitting the picked up action control signal to be transmitted through said central processing unit to the game machine for controlling the game program.

3. The method of claims 1 or 2 further comprising the step of setting a waiting time value so that the controller returns to normal operation status when there is no speech input within the set length of time after said speech recognition integrated circuit has turned to the status of receiving a control speech input.

4. A game machine controller connected to a game machine for controlling its operation by speech, comprising:

- a CPU (central processing unit) connected to said game machine and adapted to transmit a control signal so said game machine for running a game program;
- a first EEPROM (electrically erasable programmable read only memory) connected to said CPU and having a data conversion coded with serial numbers into which action control key signals for controlling actions by characters in the game program are written by said CPU;
- at least one non-speech type input device respectively connected to said CPU for game program control signal input;
- at least one speech input device respectively connected to said CPU for control speech input;
- a speech recognition intergrated circuit connected to said at least one speech input device and said CPU and adapted to receive control speeches inputted by the operator through said at least one speech input device and to convert received control speeches into corresponding control speech signals; and
- a second EEPROM (electrically erasable programmable read only memory) connected to said speech recognition integrated circuit and having a data conversion table coded with serial numbers into which control speech signals are written by said speech recognition integrated circuit;
- wherein when the operator inputs a speech through said at least one speech input device, said speech recognition integrated circuit converts the inputted speech into a corresponding speech control signal and compares it with the control speech signals of the data conversion table of said second EEPROM and then picks up the corresponding control speech signal from said second EEPROM and sends the picked-up speech signal to said CPU, enabling said CPU to pick up the corresponding action control key signal for said first EEPROM and to send the picked-up action control key signal to said game machine for running the game program.

5. A game machine controller connected to a game machine for controlling its operation by speech, comprising:

- a CPU (central processing unit) connected to said game machine and adapted to transmit a control signal to said game machine for running a game program;
- at least one speech input device respectively connected to said CPU for game program control signal input;
- at least one speech input device respectively connected to said CPU for control speech input;
- a speech recognition integrated circuit connected to said at least one speech input device and said CPU and adapted to receive control speeches inputted by the operator through said at least one speech input device and to convert received control speeches into corresponding control speech signals; and
- an EEPROM (electrically erasable programmable read only memory) connected to said speech recognition integrated circuit and having a data conversion table coded with control speech signals into which action control key signals for controlling actions by characters in the game program are written by said speech recognition integrated circuit;
- wherein when the operator inputs a speech through said at least one speech input device, said speech recognition integrated circuit converts the inputted speech into a corresponding speech control signal and compares it with the control speech signals of the data conversion table of said EEPROM and then picks up the corresponding control speech signal from said EEPROM and sends the picked-up control speech signal to said game machine through said CPU for running the game program.

6. The game machine controller of claim 4 further comprising display means connected to said CPU and adapted to display speech control signals or action control signals inputted by the operator.

7. The game machine controller of claim 4, wherein said at least one non-speech type input device includes a keyboard.

8. The game machine controller of claim 4, wherein said at least one non-speech type input device includes a joystick.

9. The game machine controller of claim 4, wherein said at least one speech type input device includes a microphone.

10. The game machine controller of claim 6, wherein said display means is comprised of a set of light emitting diodes.

11. The game machine controller of claim 6, wherein said display means is a liquid crystal display.

12. The game machine controller of claim 5 further comprising display means connected to said CPU and adapted to display speech control signals or action control signals inputted by the operator.

13. The game machine controller of claim 5, wherein said at least one non-speech type input device includes a keyboard.

14. The game machine controller of claim 5, wherein said at least one non-speech type input device includes a joystick.

15. The game machine controller of claim 5, wherein said at least one speech type input device includes a microphone.

16. The game machine controller of claim 12, wherein said display means is comprised of a set of light emitting diodes.

17. The game machine controller of claim 12, wherein said display means is a liquid crystal display.

* * * * *